US010995870B2

(12) United States Patent
Quaglia et al.

(10) Patent No.: US 10,995,870 B2
(45) Date of Patent: May 4, 2021

(54) PRESSURE RELIEF VALVE

(71) Applicant: Microtecnica S.r.l., Turin (IT)

(72) Inventors: Enrico Quaglia, Chieri (IT); Claudio Carpignano, Torinese (IT); Dario Turturici, Collegno (IT)

(73) Assignee: MICROTECNICA S.R.L., Turin (IT)

( * ) Notice: Subject to any disclaimer, the term of this patent is extended or adjusted under 35 U.S.C. 154(b) by 131 days.

(21) Appl. No.: 16/143,545

(22) Filed: Sep. 27, 2018

(65) Prior Publication Data

US 2019/0170266 A1 Jun. 6, 2019

(30) Foreign Application Priority Data

Dec. 1, 2017 (EP) .................................. 17204962.9

(51) Int. Cl.
| | |
|---|---|
| *F16K 17/06* | (2006.01) |
| *F16K 27/02* | (2006.01) |
| *F16K 1/38* | (2006.01) |
| *F16K 17/04* | (2006.01) |
| *F16K 17/08* | (2006.01) |
| *F16K 15/02* | (2006.01) |

(52) U.S. Cl.
CPC ................ *F16K 17/06* (2013.01); *F16K 1/38* (2013.01); *F16K 17/0466* (2013.01); *F16K 17/082* (2013.01); *F16K 27/02* (2013.01); *F16K 15/025* (2013.01); *Y10T 137/7932* (2015.04)

(58) Field of Classification Search
CPC ........ F16K 17/06; F16K 1/38; F16K 17/0466; F16K 17/082; F16K 27/02; F16K 15/025; Y10T 137/7932; Y10T 137/7929
See application file for complete search history.

(56) References Cited

U.S. PATENT DOCUMENTS

| | | | | | |
|---|---|---|---|---|---|
| 2,781,775 | A | * | 2/1957 | Merrill | ..................... F16K 17/30 137/498 |
| 2,934,080 | A | * | 4/1960 | Rice | ......................... F16K 17/18 137/98 |
| 3,010,695 | A | * | 11/1961 | Banks | ................... F16K 39/022 251/205 |
| 3,145,733 | A | * | 8/1964 | Shaw | ......................... F16K 1/38 137/583 |
| 3,232,709 | A | * | 2/1966 | Cole, III | ................. B29B 7/582 422/115 |

(Continued)

FOREIGN PATENT DOCUMENTS

| | | |
|---|---|---|
| CN | 203532939 U | 4/2014 |
| DE | 202006009403 U1 | 8/2006 |

(Continued)

OTHER PUBLICATIONS

Extended European Search Report for International Application No. 17204962.9 dated May 30, 2018, 12 pages.

*Primary Examiner* — Marina A Tietjen
*Assistant Examiner* — Frederick D Soski
(74) *Attorney, Agent, or Firm* — Cantor Colburn LLP

(57) ABSTRACT

A new type of pressure relief valve is described herein which has advantages over standard valves in that it may comprise a longer plunger than normal, and two guiding points located far away from each other for guiding the plunger within the housing. The valve may also comprise improved exhaust ports and an anti-rotation washer.

12 Claims, 3 Drawing Sheets

(56) References Cited

U.S. PATENT DOCUMENTS

| | | | | |
|---|---|---|---|---|
| 3,275,290 | A * | 9/1966 | Siver | F16K 1/38 251/330 |
| 3,487,852 | A * | 1/1970 | Kikendall | F16K 17/10 137/514.5 |
| 3,550,617 | A * | 12/1970 | Johnson | F16K 17/00 137/514.5 |
| 3,703,273 | A * | 11/1972 | Illing | F16K 1/38 251/122 |
| 3,945,396 | A * | 3/1976 | Hengesbach | F16K 15/026 137/496 |
| 4,022,113 | A * | 5/1977 | Blatt | F16K 15/02 91/443 |
| 4,103,704 | A * | 8/1978 | Richards | F16K 17/06 137/522 |
| 4,292,990 | A * | 10/1981 | Pareja | B60S 3/00 137/115.26 |
| 4,312,376 | A * | 1/1982 | Allen | F16K 15/063 137/494 |
| 4,350,179 | A * | 9/1982 | Bunn | F04B 39/1053 137/246.12 |
| 4,420,011 | A * | 12/1983 | Roger | F16K 11/048 137/269 |
| 4,530,373 | A * | 7/1985 | Bork, Jr. | F16K 41/04 137/516.29 |
| 4,541,455 | A * | 9/1985 | Hauser | F16K 24/04 137/516.27 |
| 4,601,310 | A * | 7/1986 | Phillips | F16K 1/38 137/556 |
| 4,679,865 | A | 7/1987 | Ulrich et al. | |
| 4,757,974 | A * | 7/1988 | Ward | F16K 15/063 137/542 |
| 4,790,348 | A * | 12/1988 | Gausman | F16K 17/04 137/516.29 |
| 4,813,452 | A * | 3/1989 | Smith | F16K 1/12 137/514.7 |
| 5,215,116 | A | 6/1993 | Voss | |
| 5,246,030 | A * | 9/1993 | Jerina | F16K 17/0426 137/478 |
| 5,290,096 | A | 3/1994 | Beck et al. | |
| 5,551,475 | A * | 9/1996 | Nelson | F16K 17/06 137/509 |
| 5,623,962 | A * | 4/1997 | Danzy | F16K 17/04 137/469 |
| 6,095,183 | A * | 8/2000 | Taylor | F16K 17/06 137/475 |
| 6,289,927 | B1 * | 9/2001 | Kaneko | G05D 16/187 137/529 |
| 9,303,660 | B2 | 4/2016 | Marocchini et al. | |
| 9,377,114 | B2 * | 6/2016 | Reifenberger | F16K 15/00 |
| 9,879,792 | B1 * | 1/2018 | Wyatt | F17C 13/04 |
| 2001/0027811 | A1 * | 10/2001 | Hirano | F01M 1/16 137/538 |
| 2006/0102867 | A1 * | 5/2006 | Matsuhashi | F16K 1/04 251/368 |
| 2006/0196553 | A1 * | 9/2006 | Kane | F16K 15/026 137/538 |
| 2006/0243329 | A1 * | 11/2006 | Doble | F02M 37/0023 137/542 |
| 2007/0034263 | A1 * | 2/2007 | Muller | F16K 17/0466 137/540 |
| 2007/0120087 | A1 * | 5/2007 | Rodriguez-Amaya | F02M 61/1873 251/356 |
| 2007/0137711 | A1 * | 6/2007 | Krebs | F16K 27/0209 137/454.5 |
| 2008/0111088 | A1 * | 5/2008 | Simonelli | F16K 17/06 251/60 |
| 2009/0278266 | A1 * | 11/2009 | Freitas | B05B 1/06 261/62 |
| 2013/0239570 | A1 * | 9/2013 | Woollenweber | F02B 37/16 60/611 |
| 2014/0182717 | A1 * | 7/2014 | Edgeworth | F16K 15/063 137/540 |
| 2015/0059884 | A1 * | 3/2015 | Grenaway | F16K 17/06 137/538 |
| 2015/0129057 | A1 * | 5/2015 | Shreve | F16K 1/42 137/538 |
| 2016/0061340 | A1 * | 3/2016 | Shen | F16K 15/20 5/706 |
| 2016/0363229 | A1 * | 12/2016 | Thompson | F16K 17/06 |
| 2017/0159610 | A1 * | 6/2017 | Ehlig | F16K 49/00 |
| 2017/0159834 | A1 * | 6/2017 | Jeon | F16K 27/0209 |

FOREIGN PATENT DOCUMENTS

| | | |
|---|---|---|
| EP | 1939506 A1 | 7/2008 |
| WO | 2014203766 A1 | 12/2014 |

\* cited by examiner

PRESSURE RELIEF VALVE

FOREIGN PRIORITY

This application claims priority to European Patent Application No. 17204962.9 filed Dec. 1, 2017, the entire contents of which is incorporated herein by reference.

TECHNICAL FIELD

The present disclosure relates to the field of high accuracy pressure relief valves such as those which may be used in aircraft such as anti-ice valves. The valves may also be for other uses.

BACKGROUND

Pressure relief valves are often used to regulate the output pressure on engine anti-ice valves (or other equivalent functions). In order to function properly in such environments they are required to provide a very stable regulation over a wide range of environmental conditions throughout their life.

In current valve designs, when used in combination with specific operative conditions, known valves have been known to produce spurious undesired phenomena such as oscillations, hysteresis and loss of calibration. Such phenomena may affect the overall valve performance and result in output inaccuracy.

Improvements in such pressure relief valves are therefore needed in order to create more reliable and accurate pressure relief valves.

SUMMARY OF INVENTION

According to a first aspect, the examples described herein provide a pressure relief valve comprising: a housing having a first end and opposite second end and a housing side wall extending there between; and an inlet port provided at the first end of the housing; and at least one discharge port extending through the housing side wall; and a plunger provided within the interior of the housing; the plunger being configured to move between a first position wherein the plunger is blocking the at least one discharge port and a second position wherein the plunger is not blocking the at least one discharge port; and wherein the plunger has a significantly low diameter to length ratio than 1:2 (preferably about 1:4).

In some examples, the plunger may extend longitudinally between a first end and a second end and an outer surface of the plunger may contact a first internal feature of the valve housing at a first point at the first end of the plunger and contact a second internal feature of the valve housing at a second point at the second end of the plunger. These contact points may therefore act as guiding points for guiding the relatively long plunger longitudinally within the housing.

In some examples, the first internal feature may comprise the inner surface of the valve housing itself.

In some examples, the valve may further comprise a calibration means provided at its second end and the second internal feature may comprise a surface of the calibration means.

In some examples described herein, the calibration means may comprise a rotatable calibration cap.

According to a second aspect, a pressure relief valve is described comprising: a housing having a longitudinal axis L, the housing extending between a first end and an opposite second end and a housing side wall extending between the first and second ends; and an inlet port provided at the first end of the housing; and at least one discharge port extending through the housing side wall; and a plunger provided within the interior of the housing; the plunger being configured to move between a first position wherein the plunger is blocking the at least one discharge port and a second position wherein the plunger is not blocking the at least one discharge port; and wherein the at least one discharge port extends at a first angle that is not perpendicular to the longitudinal axis L, so as to optimise the discharge air flow.

In some examples, the plunger may comprise an outer surface and the section of the outer surface of the plunger that blocks the discharge port in the first position may extend at an angle that is also not perpendicular to the housing longitudinal axis.

In some examples, the plunger may comprise an outer surface and the section of the outer surface of the plunger that blocks the discharge port in the first position extends at a second angle that is inclined relative to the longitudinal axis L. In some examples, the discharge ports may also extend at an angle that is inclined relative to the longitudinal axis. The outer surface and the discharge ports may further incline in the same direction relative to the longitudinal surface.

In some examples, the first angle (i.e. of the discharge port) and the second angle (i.e. of the plunger outer surface) are at least similar. In some examples, the first and second angles may be identical.

In some examples, the pressure relief valve may further comprise a plurality of discharge ports.

In some examples, the pressure relief valve may further comprise a spring configured to exert force on the plunger, and an adaptor that is shaped and sized so as to provide a connection between the spring and an outer surface of the plunger so that pressure provided by the spring is transferred to the plunger in the direction of the at least one discharge port.

According to a third aspect, a pressure relief valve is described comprising: a housing having a side wall extending between a first end and an opposite second end of the housing; and a rotatable calibration cap provided at the second end of the housing; and an inlet port provided at the first end of the housing; and at least one discharge port extending through the housing side wall; and a plunger provided within the interior of the housing; and a spring provided around the plunger, the spring being configured to provide pressure to the plunger in the direction X of the inlet port; the plunger having a first end and an opposite second end and being configured to move between a first position wherein the first end of the plunger is blocking the at least one discharge port and a second position wherein the first end of the plunger is not blocking the at least one discharge port; and further comprising an anti-rotation washer provided at the second end of the plunger, the anti-rotation washer being configured to prevent rotation of the spring when the calibration cap is rotated.

In some examples, the anti-rotation washer may comprise a plurality of teeth on its outer circumference as a means of providing antirotation.

In some examples, a portion of the inner surface of the housing that contacts the anti-rotation washer in use may comprise a plurality of grooves, the grooves being shaped and sized so as to mate with the teeth of the anti-rotation washer.

Any of the new examples and aspects of the valves described herein may be provided in any combination within a single valve or alternatively may be provided separately to each other.

A method of manufacturing a pressure relief valve is also described herein comprising: providing a housing having a first end and opposite second end and a housing side wall extending there between; and providing an inlet port at the first end of the housing and providing at least one discharge port to extend through the housing side wall and providing a plunger within the interior of the housing; the plunger being configured to move between a first position wherein the plunger is blocking the at least one discharge port and a second position wherein the plunger is not blocking the at least one discharge port; and providing the plunger so as to have a diameter to length ratio of about 1:4.

A method of manufacturing a pressure relief valve comprising: providing a housing having a longitudinal axis L, the housing extending between a first end and an opposite second end and having a housing side wall extending between the first and second ends; and providing an inlet port at the first end of the housing; and further providing at least one discharge port that extends through the housing side wall; and further providing a plunger within the interior of the housing; the plunger being configured to move between a first position wherein the plunger is blocking the at least one discharge port and a second position wherein the plunger is not blocking the at least one discharge port; and wherein the step of providing the at least one discharge port comprises forming the at least one discharge port so that it extends through the housing side wall at a first angle that is not perpendicular to the longitudinal axis L.

A method of manufacturing a pressure relief valve comprising: providing a housing having a side wall extending between a first end and an opposite second end of the housing; and providing a rotatable calibration cap at the second end of the housing; and providing an inlet port at the first end of the housing; and providing at least one discharge port that extends through the housing side wall; and further providing a plunger provided within the interior of the housing; and providing a spring around the plunger, the spring being configured to provide pressure to the plunger in the direction X of the inlet port; the plunger having a first end and an opposite second end and being configured to move between a first position wherein the first end of the plunger is blocking the at least one discharge port and a second position wherein the first end of the plunger is not blocking the at least one discharge port; and further comprising an anti-rotation washer provided at the second end of the plunger, the anti-rotation washer being configured to prevent rotation of the spring when the calibration cap is rotated.

The methods of manufacturing these valves may further comprise providing any of the additional features of the valves also described herein, either alone or in combination.

DESCRIPTION OF THE FIGURES

Certain embodiments of the present disclosure will now be described in greater detail by way of example only and with reference to the accompanying drawings in which.

DETAILED DESCRIPTION

Figure 2:
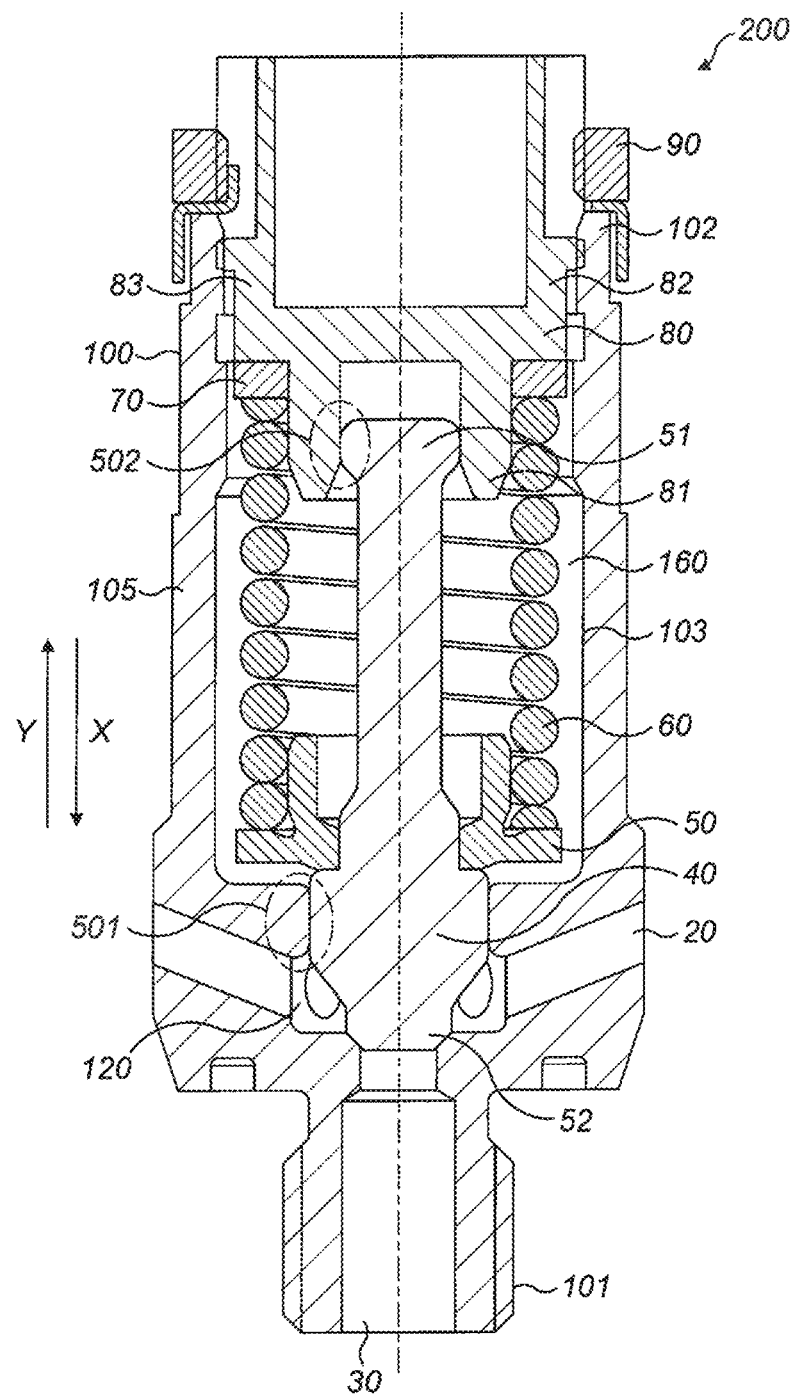
FIG. 2 depicts a cross-sectional view of a new and improved pressure relief valve, highlighting the contact points of the plunger.
Figure 3:
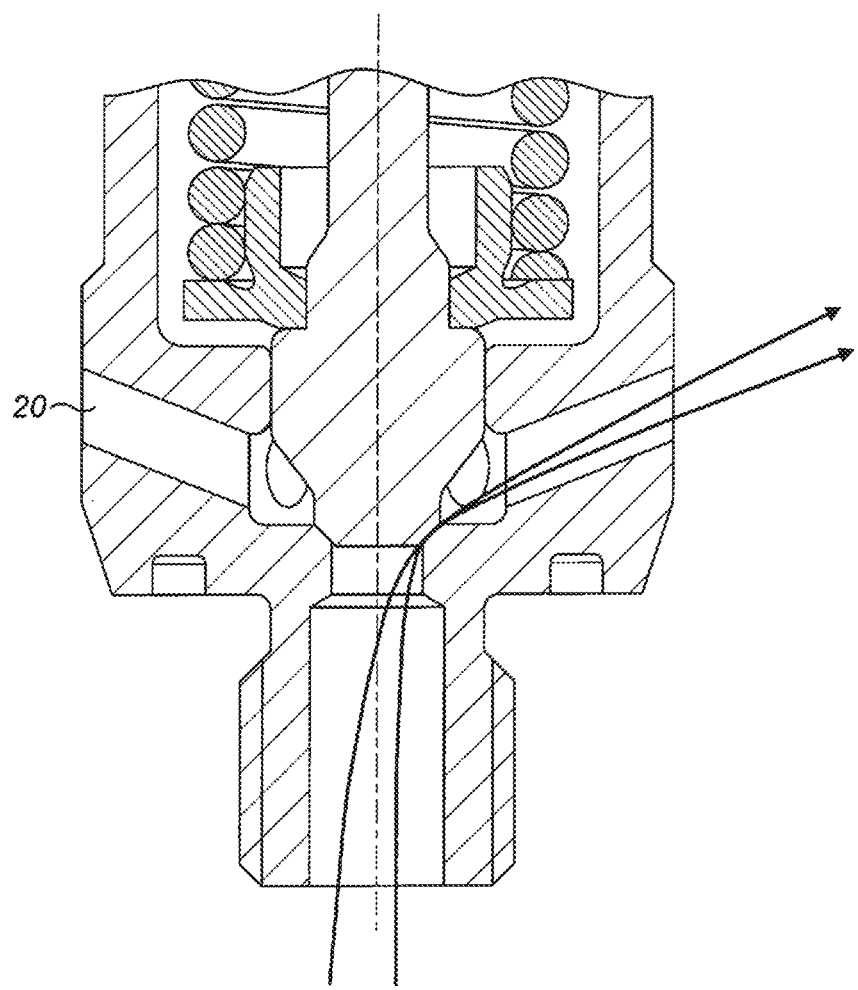
FIG. 3 depicts a cross-sectional view of the discharge section of the valve, and the inclined angles of the exhaust ports and plunger profile.
Figure 4:
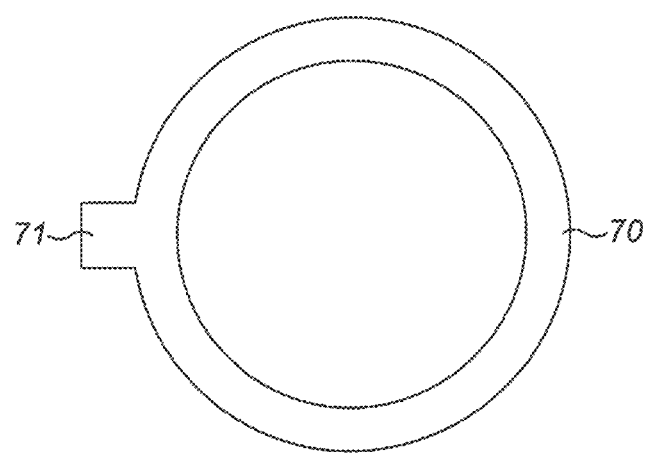
FIG. 4 depicts an aerial view of the anti-rotation washer of FIGS. 2 and 3.

The examples described herein with reference to FIGS. 2 to 4 are aimed at overcoming problems associated with known pressure relief valves. The examples described herein are able to overcome the disadvantages associated with known devices wherein, for example, inaccuracies in the manufacture of the internal spring lead to the internal spring generating unwanted side loads onto the plunger internal surface.

The examples described herein are also able to overcome problems associated with known devices, discussed below, relating to the internal airflow path of the pressure valve and the way the plunger is guided within the valve.

The examples described herein provide a different valve configuration to known valves. The internal components are designed to provide: a) better plunger guidance, b) better compensation of spring tolerances and c) better airflow path.

Figure 1:
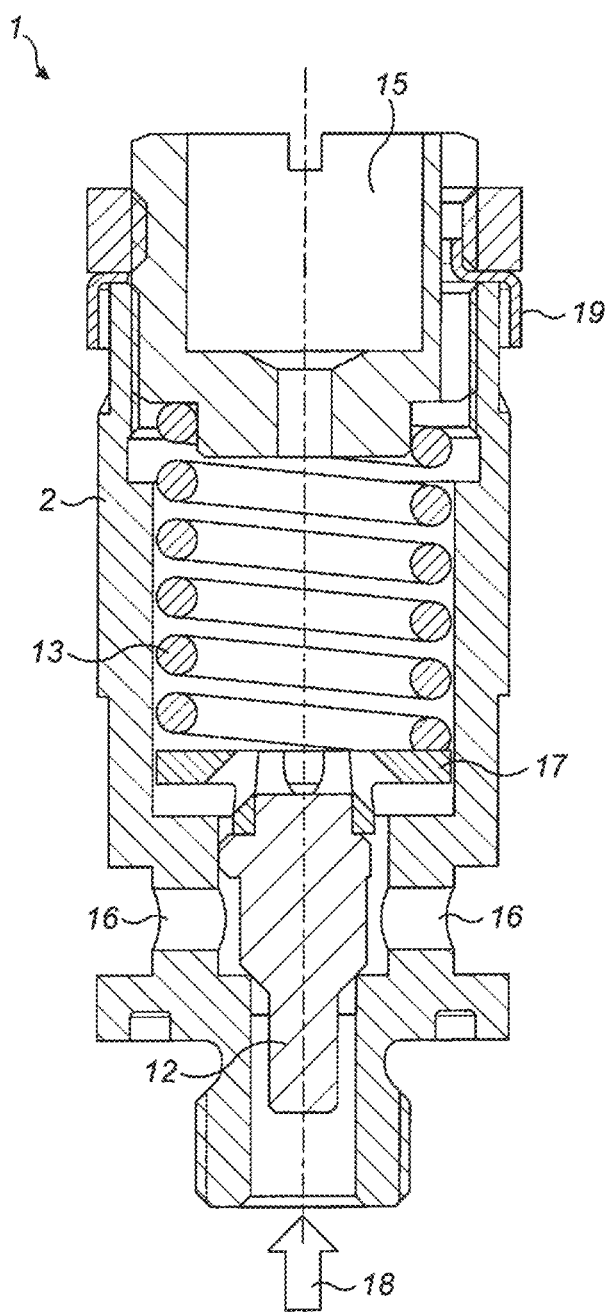
FIG. 1 depicts a cross-sectional view of a known pressure relief valve.

A known, standard, pressure relief valve 1 is shown in FIG. 1. The known valve 1 comprises a main housing 2, a plunger 12, a spring 13, a calibration cap 15 and a cap-locking feature 19. The known valve 1 also comprises a spring plate 17 and discharge ports 16. In use, inlet pressure is provided at the base 18 of the valve via the inlet port 18 as is known in the art.

FIG. 2 shows a new type of valve 200 that may be used in a pressure environment such as an anti-ice valve for an aircraft. The new type of valve 200 may also be used in other environments and for other uses and is not limited to this particular use or field, however.

The new valve 200 comprises a main housing 100 and a housing external wall 105 that may be generally cylindrical in shape both internally and externally. The valve 200 further comprises air discharge ports 20 located so as to extend from the interior of the housing, through the cylindrical wall 105 of the housing 100 and to the exterior of the housing 100. These discharge ports 20 therefore allow air to flow from the interior of the housing 100, through the housing wall 105 and to the exterior of the housing 100. New and improved features of these discharge ports 20 are further described below.

The housing 100 may comprise a spring chamber 160 and a discharge chamber 120, the housing 100 being fitted with at least one, or a plurality of exhaust ports 20 extending through the wall 105. An inlet port 30 is also provided at a first end 101 of the housing, the inlet port 30 being connected to the process (not shown) to be controlled. In use, inlet pressure may be provided to the valve 100 via this inlet port 30.

A plunger 40 is provided within the housing 100 and is operated by a spring 60, which provides a certain level of pressure on the plunger 40 in the direction X (i.e. in the direction of the inlet 30 and outlet/exhaust ports 20. The spring 60 is provided in a first, spring chamber section 160 of the housing, whereas the plunger 60 is able to extend from this spring chamber section 160 to a second, discharge section 120 that lies beyond this spring chamber section 160 as shown in FIG. 2. The discharge/exhaust port(s) are provided in this second discharge section 120. This pressure on the spring 60 in the direction X therefore acts to keep the inlet port 30 shut and isolated from the exhaust port(s) 20 until a predetermined pressure value at the inlet port 30 in the opposite direction Y is achieved.

The spring 60 further may operate the plunger 40 via the use of an adaptor 50. The adaptor 50 may be shaped and sized so as to provide a suitable connection between the spring 60 and the outer surface of the plunger 40 so that pressure provided by the spring is transferred to the plunger 40 in the X direction.

The set-point of the position of the plunger 40 within the housing 100 of the valve 200 may be regulated through the use of a calibration cap 80 that is provided at the end of the plunger 40 that is furthest away from the inlet 30 and outlet/exhaust ports 20. In some examples, the calibration cap 80 may be properly threaded so as to provide the desired level of compression to the spring 60 by simple means of a rotation of the calibration cap 80.

The calibration cap 80 may further be secured against undesired rotation by the provision of a locking mechanism 90, which in the example shown in FIG. 2 comprises a ferrule 90. In order to ensure optimised co-axiality, the calibration cap 80 may be designed to ensure its perfect centring in the valve housing 100. This will enhance alignment of the plunger within its two guiding points, i.e. leading to lower hysteresis and higher stability.

The calibration cap 80 such as depicted in FIG. 2 may be generally cylindrical in shape with an open end 81 opposite a closed end 82. The calibration cap 80 therefore may be somewhat cup shaped with a generally cylindrically shaped wall 83 extending between the open end 81 and the closed end 82.

In use, the open end 81 of the calibration cap 80 is inserted into the open end 102 of the valve housing 100 so as to enclose the plunger 40 within the housing 100. The outer surface of the wall 83 of the open end of the calibration cap 80 may therefore be shaped and sized relative to the interior surface 103 of the housing 100 so that the outer surface of the wall 83 of the calibration cap 80 contacts the interior surface 103 of the main housing 100 at the housing open end 102. As described herein, the open end of the calibration cap 80 may also contact the plunger at a contact point or points to act as a guide to the plunger.

In some examples, the valve 200 may also further comprise an antirotation washer 70 that prevents the spring 60 from being torqued when calibrating the valve 200. This may be achieved by the anti-rotation washer 70 being fitted with one or more external teeth 71 (shown in FIG. 4) that engage correspondingly shaped and sized longitudinal slots (not shown) in the housing 100.

The new and improved features of the valve 200 of FIG. 2 will now be discussed in greater detail with reference to FIGS. 2 to 4.

The valve depicted in FIG. 2 differs from known relief valves in a number of ways. One difference is that the plunger 40 may be provided in a length that is substantially longer than known plungers of pressure relief valves and the plunger 40 may further be guided via internal features of the valve that are within the housing 100, at certain points 501 and 502 that are located relatively far apart from each other.

For example, in known valves, the diameter to length ratio of a plunger would be typically 1:2, whereas in the new valves described herein, the ratio would be lower than 1:2 and in some cases significantly lower (e.g. preferably about 1:4). In the example shown in FIG. 2, the relatively longer plunger 40 extends longitudinally from its first end 52 (closest to the exhaust ports 20) to its second end 51 (closest to the calibration cap 80) and contacts the inner surface of the housing 100 at a first internal feature of the housing at a contact point 501 at its first end 52 and contacts a second internal feature of the valve housing 100 at a second contact point 502, which in this example is a surface of the calibration cap 80 at its second, opposite end, 51. These two contact points 501, 502 at opposite ends of the plunger 40 therefore act as guide points for guiding the longer plunger 40 within the housing 100. These contact points may in theory be between any internal features of the valve housing 100 and should not be limited to the contact points being between the valve housing inner surface and a surface of the calibration cap 80.

This very low diameter-to-length ratio provides for two advantageous effects: a) the plunger is better aligned with the assembly and b) the plunger has lower side-loads at the two friction points. In known devices, such side loads are normally caused by the unavoidable imperfections of the spring. Both effects of this new example therefore lead to smoother plunger operation, i.e. higher stability and lower hysteresis.

A method of manufacturing a pressure relief valve 200 having these features may therefore comprise providing a housing 100 having a first end 101 and opposite second end 102 and a housing side wall 105 extending there between; and providing an inlet port 30 at the first end 101 of the housing 100; and providing at least one discharge port 20 to extend through the housing side wall 105; and providing a plunger 40 within the interior of the housing 100; the plunger 40 being configured to move between a first position wherein the plunger is blocking the at least one discharge port 20 and a second position wherein the plunger is not blocking the at least one discharge port 20; and providing the plunger 40 so as to have a diameter to length ratio of 1:4. The method of manufacture may also comprise also providing any of the additional features of the valves described herein.

A further difference between the examples described herein and known pressure relief valves is depicted in FIG. 3 in greater detail. FIG. 3 depicts in greater detail the section of the valve housing 100 that comprises the exhaust/outlet ports 20. As is shown in FIG. 1, in known valves the exhaust ports 16 are provided so as to extend in a direction P that is approximately perpendicular to the longitudinal axis L of the housing and/or plunger.

As can be seen in FIG. 3, however, it has been found that an enhanced and improved air exhaust port 20 can be provided by inclining the angle of the exhaust port(s) so that it extends at an angle that is not perpendicular to the longitudinal L axis of the housing. It has further been found that this effect may also further be enhanced by also inclining the angle of the plunger profile at the section of the plunger that is in the vicinity of the exhaust port(s) 20. The angle of the plunger outer surface may also preferably be similar to, or the same as, the angle of the exhaust port 20 as shown in FIG. 3 and may generally extend in the same direction to each other as shown in FIG. 3.

The plunger profile and discharge ports are therefore provided so as to extend at inclined angles, as shown in FIG. 3. As a smooth air flow from the inlet port 30 to the exhaust port 20 is key to obtain stable valve behaviour, the discharge ports 20 are therefore, in this way, inclined to facilitate the air stream, whilst the plunger 40 is similarly profiled in order to "duct" the airflow to the ports 20. In some examples, a reduced gap between the plunger 40 and the guiding section within the housing, will minimise turbulences and undesired air ingress into the spring chamber 160.

In order to provide a smooth air flow, a greater plurality of discharge ports than normal may also be provided. This is also supported by the relative shape of the profile of the plunger 40 which is designed to drive the airflow directly and seamlessly to the discharge ports 20. This results in lower spurious effects of turbulences, such as instability.

A method of manufacturing a pressure relief valve 200 having these features may therefore comprise providing a housing 100 having a longitudinal axis L, the housing extending between a first end 101 and an opposite second end 102 and having a housing side wall 105 extending between the first 101 and second ends 102; and providing an inlet port 30 at the first end 101 of the housing 100; and further providing at least one discharge port 20 that extends through the housing side wall 105; and further providing a plunger 40 within the interior of the housing 100; the plunger 40 being configured to move between a first position wherein the plunger is blocking the at least one discharge port 20 and a second position wherein the plunger is not blocking the at least one discharge port 20; and wherein the step of providing the at least one discharge port 20 comprises forming the at least one discharge port 20 so that it extends through the housing side wall at a first angle that is not perpendicular to the longitudinal axis L. The method of manufacture may also include providing any of the other features of the valves described herein, either alone or in combination.

A further difference that the examples described herein may have, that is not known in standard pressure relief valves is a new type of anti-rotation washer 70, which is depicted in more detail in FIG. 4.

For example, the pressure relief valve 200 may comprise a housing 100 as described above, with a side wall, the housing side wall 105 extending between a first end 101 and an opposite second end 102 of the housing. As can be seen in FIGS. 2 and 4, the valve may also comprise a rotatable calibration cap 80 at the valve housing second end. The calibration cap 80 may be associated with the plunger 40 and spring 60 so that rotation of the calibration cap 80 provides pressure onto the spring 60 and therefore plunger 40 in the direction X so as to allow for the calibration of the set point of the plunger 40 within the housing. The inlet port 30 is provided at the first end 101 of the housing 100 and the discharge port or ports 20 extend through the housing side wall 105 as described above, to allow air to be expelled from the interior of the housing. The plunger 40 is also provided within the interior of the housing and extends between the plunger chamber 160 and the discharge chamber 120 as also described above. The spring may be provided around the section of the outer circumference of the plunger that extends within the plunger chamber 160 and in use the spring is configured to provide pressure to the plunger in the direction X of the inlet port 30. The plunger 40 is therefore configured to move between a first position wherein the first end 52 of the plunger is blocking the at least one discharge port 20 and a second position wherein the first end 52 of the plunger is not blocking the at least one discharge port 20.

In the particular examples wherein the valve comprises an anti-rotation washer 70, this would be provided at the second end 51 of the plunger 40 and the anti-rotation washer 70 is configured to prevent rotation of the spring 60 when the calibration cap 80 is rotated. In some examples, and as described above, this may be achieved due to the fact that the anti-rotation washer 70 comprises one tooth or a plurality of teeth 71 on its outer circumference. In some other examples, an inner surface 103 of the housing comprises a plurality of grooves, the grooves being shaped and sized so as to compliment the size and shape of the teeth so that they mate with the teeth and provide anti-rotation.

The anti-rotation washer may eliminate any torque loads on the spring 60 that may possibly be induced by the calibration cap 80 as the cap 80 is rotated during calibration. In standard valves without this anti-rotation washer 70 such torque loads are spurious and uncontrolled and may result in difficulties upon calibration and/or valve drift during operations.

As described above, the anti-rotation washer 70 may comprise one or more external teeth 71 as shown in FIG. 4, that will engage one or more corresponding longitudinal slots in the interior surface 103 of the housing 100.

A method of manufacturing a pressure relief valve 200 having this feature may comprise: providing a housing 100 having a side wall 105 extending between a first end 101 and an opposite second end 102 of the housing 100; and providing a rotatable calibration cap 80 at the second end 102 of the housing 100; and providing an inlet port 30 at the first end 101 of the housing 100; and providing at least one discharge port 20 that extends through the housing side wall 105; and further providing a plunger 40 provided within the interior of the housing 100; and providing a spring 60 around the plunger 40, the spring 60 being configured to provide pressure to the plunger 40 in the direction X of the inlet port 30; the plunger 40 having a first end 52 and an opposite second end 51 and being configured to move between a first position wherein the first end 52 of the plunger 40 is blocking the at least one discharge port 20 and a second position wherein the first end 52 of the plunger is not blocking the at least one discharge port 20; and further comprising an anti-rotation washer 70 provided at the second end 51 of the plunger 40, the anti-rotation washer 70 being configured to prevent rotation of the spring 60 when the calibration cap 80 is rotated. The method of manufacture may also include providing any of the other features of the valves described herein, either alone or in combination.

The invention claimed is:

1. A pressure relief valve comprising:
    a housing having a first end and opposite second end and a housing side wall extending there between; and
    an inlet port provided at said first end of said housing; and
    at least one discharge port extending through said housing side wall;
    a plunger provided within the interior of said housing; said plunger movable in the housing between a first position wherein said plunger is blocking said at least one discharge port and a second position wherein said plunger is not blocking said at least one discharge port;
    a rotatable calibration cap provided at said second end of said housing; and
    a spring provided around said plunger, said spring providing pressure to said plunger in a direction X of said inlet port;
    wherein said plunger has a first end and an opposite second end and is movable between said first position wherein said first end of said plunger is blocking said at least one discharge port and said second position wherein said first end of said plunger is not blocking said at least one discharge port;
    further comprising an anti-rotation washer provided at said second end of said plunger, said anti-rotation washer preventing rotation of said spring when said calibration cap is rotated; and
    wherein said anti-rotation washer comprises one tooth or a plurality of teeth on an outer circumference of the anti-rotation washer.

2. The pressure relief valve of claim 1, wherein said plunger has a diameter to length ratio of lower than 1:2.

3. The pressure relief valve of claim 1, wherein the plunger has a diameter ratio of 1:4.

4. The pressure relief valve of claim 1, wherein:
said plunger extends longitudinally between a first end and a second end; and
an outer surface of said plunger contacts a first internal feature of said valve housing at a first point at said first end of said plunger and contacts a second internal feature of said valve housing at a second point at said second end of said plunger.

5. The pressure relief valve of claim 1, wherein the valve has a longitudinal axis L extending between said first end and said opposite second end,
wherein said at least one discharge port extends at a first angle that is not perpendicular to said longitudinal axis L.

6. The pressure relief valve of claim 5 wherein,
said plunger comprises an outer surface and wherein a section of said plunger that blocks said discharge port in said first position extends at a second angle to said longitudinal axis L.

7. The pressure relief valve of claim 6, wherein said first angle and said second angle are substantially identical.

8. The pressure relief valve of claim 1, wherein an inner surface of said housing comprises a groove or a plurality of grooves, said grooves being shaped and sized so as to mate with said tooth or teeth of said anti-rotation washer.

9. A method of manufacturing a pressure relief valve comprising:
providing a housing having a first end and an opposite second end and a housing side wall extending there between; and
providing an inlet port at said first end of said housing; and
providing at least one discharge port to extend through said housing side wall;
providing a plunger within the interior of said housing; said plunger movable between a first position wherein said plunger is blocking said at least one discharge port and a second position wherein said plunger is not blocking said at least one discharge port;
providing a rotatable calibration cap at said second end of said housing; and
providing a spring associated with said plunger, said spring providing pressure to said plunger in the direction X of said inlet port;
said plunger having a first end and an opposite second end and being movable between a first position wherein said first end of said plunger is blocking said at least one discharge port and a second position wherein said first end of said plunger is not blocking said at least one discharge port; and further comprising an anti-rotation washer provided at said second end of said plunger, said anti-rotation washer preventing rotation of said spring when said calibration cap is rotated;
wherein said anti-rotation washer comprises one tooth or a plurality of teeth on an outer circumference of the anti-rotation washer.

10. The method of claim 9, further comprising providing said plunger so as to have a diameter to length ratio of less than 1:4.

11. The method of claim 9, wherein said diameter to length ratio is 1:4.

12. The method of claim 9, wherein said housing has a longitudinal axis, and wherein said step of providing said at least one discharge port comprises forming said at least one discharge port so that it extends through the housing side wall at a first angle that is not perpendicular to said longitudinal axis L.

* * * * *